May 16, 1950  B. F. RITCHIE ET AL  2,507,736
ELECTRICALLY HEATED TOOL
Filed Nov. 15, 1946
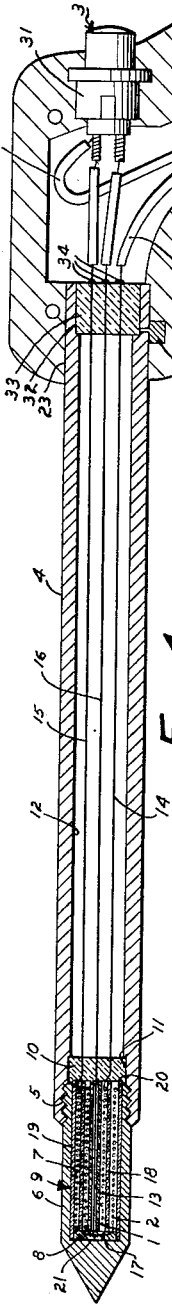
INVENTORS
BERTRAM F. RITCHIE
CHESTER H. HOLTAN
BY Paul, Paul & Moore
ATTORNEYS Patented May 16, 1950

2,507,736

UNITED STATES PATENT OFFICE 2,507,736

ELECTRICALLY HEATED TOOL

Bertram F. Ritchie and Chester H. Holtan,
Minneapolis, Minn.

Application November 15, 1946, Serial No. 710,124

5 Claims. (Cl. 219—26)

This invention relates to new and useful improvements in electrically heated tools. Foremost among these tools are soldering irons, brazing tools, welding tools, and tools for firing explosive rivets.

An object of our invention is to provide in one tool several different heating characteristics controlled or selected by a switch conveniently located in the electrical heating element circuit so as to employ various combinations of a double section electrical resistance wire wound heating element located either within a bore in the working tip or around the working tip. The first of these characteristics is a controlled quick heating tip for rapid starts. During the initial warm up period of the tool, this characteristic reduces the wasted waiting time of the tool operator from minutes to seconds merely by the snap of a switch. The second of these characteristics is a continuously heated tool tip, having an electrical current flowing continuously through the double section resistance wire wound heating element as long as it is connected to its operating voltage, with a tool tip working temperature and heat generating capacity intended for average duty use. Since under this condition the temperature of the tool tip is less than that temperature required for heavy duty use, oxidation of both the tool working tip and tinning alloy on the tip is reduced during both the idle operating periods and the periods of average use of the tool; thus maintenance of the tool is reduced and longer tool life is promoted. In operating the tool normally under this average duty condition instead of continuously under a heavy duty condition, when the latter is not always necessary, electrical power consumption is reduced which results in a lower operating cost of the tool. The third of these characteristics is a controlled potentially higher heated tool tip, having a higher electrical power input to the double section resistance wire wound heating element, available at the snap of the switch immediately providing a much higher tool tip temperature and heat generating capacity sufficient for the heavier duty requirements of the tool not satisfied by the normal continuously heated tool tip which was mentioned as the second characteristic. Tool tip temperatures and heat generating capacities intermediate to the normal continuous average operating condition of the tool tip and the highest temperature and heat condition available at the tool tip are obtained by cycling the switch between the continuous average and the high heat positions as required by the operator of the tool to meet the demands of the work being done. This third characteristic provides economical heavy duty operation by employing additional heat and electrical power in the tool tip only when and to the extent needed during actual heavy duty use. This results too in a minimum of oxidation of the tool tip and of the tinning alloy on the tip again reducing maintenance of the tool and promoting longer tool life.

A further object of this invention is to locate the double section electrical resistance wire wound heating element within or around the working tip of the tool. This location reduces the thermal conduction lag between the time the heat is generated by the double section electrical heating element and the time it reaches the working tip. Another location, such as the barrel, would introduce considerable thermal conduction lag which is highly undesirable. By locating the double section electrical heating element within or around the working tip, the reduced thermal conduction lag aids quicker starts and promotes a quicker recovery after a temperature drop in the tip. Since, with this improvement, less mass on the tool has to be heated in order to secure a satisfactory working temperature at the tip, a smaller heat generator can be used. Since a smaller heat generator can be used, the electrical heating element can be designed to operate on a smaller amount of electrical power. This results in a further reduction in electrical power operating cost.

The double section electrical heating element section located within or around the tip can be designed to permit an increase in the maximum quantity of heat that can be stored in the working tip in the high heat position of the switch. This is accomplished by selecting, as a resistance wire for the double section electrical heating element, a wire which has a high value of resistance per circular mil foot and a diameter of this wire which is the smallest or nearly the smallest diameter recommended by the manufacturer of this resistance wire for the highest value of power input to be used in the tool. This resistance wire wound double section electrical heating element will then operate at a higher temperature than would a heating element constructed with a larger diameter wire or a wire of less resistance per circular mil foot even though the resistance of the element and the electrical power input be the same in both cases. Since the quantity of heat stored in the working tip is a function of the mass of the tip and of the temperature, it follows that with a given tip, a given tool, and a given electrical power input to the heating element the tip will store a greater quantity of heat if the temperature is increased. By designing the heating element section or sections for the high heat operation as described above, this design accomplishes an increase in the quantity of heat that can be stored in the tip.

The use of a resistance wire with a high value of resistance per circular mil foot and with a small diameter assists greatly in the construction of a physically small double section heating element that can be located within or around the working tip of the tool.

The feature of the reduced thermal conduction lag and the design of the element for increased heat and temperature in the tip in the high heat position of the switch, both feature and design previously described, while important for accelerating the heating of the working tip and the operation of the tool, is of even greater importance when operating the tool under low air temperatures, particularly below zero degrees Fahrenheit, as encountered by our military forces and by transportation, power, communication, mining and some other industries in the northern latitude of this hemisphere during the winter months.

A further object of the invention is to provide in a tool of the class described, a tubular body having a handle or a supporting stand at one end and a working tip at the other end which is removable and which has an axial bore through the greater part of its length in which to locate the double section electrical heating element within the tip with the double section heating element being mechanically supported by the tubular body or barrel which extends between the working tip and the handle or supporting stand.

A further and more specific object of the invention is to provide a tool of the class described having a composite low and high heat heating element mounted therein and comprising a pair of resistance elements adapted for series or parallel operation to vary the heating characteristics of the tool, and said resistance elements being connected in an electric circuit having means for connecting it to a source of current supply, and a control switch being provided in said circuit adapted upon energization of the circuit, to connect said resistance elements for series or low heat operation, and when said switch is manipulated by the operator, said resistance elements are connected for parallel operation, whereby the composite heating element will operate at high heat with an effective energy at least four times greater than the effective energy of said heating element, when operating at low heat, as when the resistance elements are connected in series.

A further object of this invention is to provide as one of the interchangeable working tips, a working tip having a cup shaped working end adapted to the shape of and to engage the head of a rivet commonly called an explosive rivet. The rapid and high heat and temperature available with the double section electrical resistance wire wound heating element together with this cup shaped end of the working tip is readily adapted to the firing of the explosive type rivet in which a small charge of powder within the rivet is fired by heat to explode and rivet the rivet.

Another feature of this electrically heated tool is that various double section electrical heating elements can be designed for any of a wide variety of electrical power inputs as demanded by heat and temperature requirements of the tool. At the same time the double section electrical heating element can be designed for a wide range of voltage inputs to adapt the tool to various industries and localities. Since the double section heating element is a resistance and does not depend for its operation upon reactance in the circuit, the tool may be operated from either a direct or alternating voltage supply and if alternating current is used the frequency is not critical.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims set forth.

In the drawings:

Figure 1 shows the electrical circuit of our double section electrical resistance wire wound heating element and its associated switch in a series circuit combination;

Figure 2 shows the electrical circuit of our double section electrical resistance wire wound heating element and its associated switch in a parallel circuit arrangement;

Figure 3 shows the electrical circuit of our double section electrical resistance wire wound heating element and its associated switch in a series-parallel circuit arrangement;

Figure 4 is a longitudinal sectional view of our improved electrically heated tool showing the general construction thereof;

Figure 5 is an enlarged detail sectional view of the double section electrical resistance wire wound heating element in the case where the double section heating element is to be located inside the working tip.

Figure 6 is an enlarged view of the double section electrical resistance wire wound heating element secured to the end of the tubular body or barrel in the case where the double section heating element is to be located inside the working tip.

Figure 7 is a sectional view showing the working tip and the double section electrical resistance wire wound heating element secured to the tubular body or barrel in the case where the heating element is located around the tip.

Figure 8 is a detail sectional view of the end of the working tip which has been shaped to engage an explosive type rivet head.

The basic electrical circuits applied to this improved electrically heated tool are shown in Figures 1, 2, and 3. In these figures the double section electrical heating element is shown comprising two resistance sections 1 and 2 to which the voltage is applied at the point indicated at V. The amount of heat developed in the electrical heating element sections 1 and 2 is directly proportional to the amount of electrical power input to these heating element sections, and for a given voltage the amount of energy developed may be varied inversely by varying the resistance of the resistance elements.

In the circuit shown in Figure 1, the switch 3 is normally open, allowing the voltage V to be applied across the series connected double section electrical heating element consisting of sections 1, 2. By closing the single pole switch 3, preferably a snap action push-to-make switch, section 2 of the double section heating element is shorted out of the circuit. The voltage V is now applied directly across section 1 of the double section heating element. Since section 2 is no longer effective, the resistance in the composite heating element is reduced, thereby increasing the amount of heat produced by the heating element. Upon again opening the switch 3, section 2 of the double section heating element is again effective and is added in series to section 1 of the circuit, resulting in the sum of the resistance of the two sections 1 and 2 reducing the amount of heat being produced.

In the circuit shown in Figure 2, the switch 3 is normally open allowing the voltage V to be applied across section 1 only of the double section electrical heating element. By closing the single pole switch 3, preferably a snap action push-to-make switch, section 2 of the heating element is placed in parallel with section 1 and the applied voltage V. In a parallel resistance circuit the total resistance of the parallel combination is less than that of any one of the parallel resistances, that is $1/R_t = 1/R_1 + 1/R_2$ etc., where $R_t$ is the total resistance of the parallel circuit and $R_1$ and $R_2$ etc. are the circuit resistors in parallel. Since the resistance of the double section heating element 1, 2 has been reduced by closing the switch 3, the amount of heat being produced by the heating element will be increased. When the switch 3 is again opened, section 2 of the double section heating element is no longer in the circuit. The resistance of the heating element is thereby increased and the amount of heat being produced is reduced.

In the circuit shown in Figure 3, the switch 3 is normally in low heat position, as in Figures 1 and 2, wherein the resistance elements 1 and 2 of the composite heating element are in series connection with the applied voltage V. When the switch 3, which is a double pole, double throw, snap action, push-to-make-the-other-circuit type, is manipulated by the operator, resistance element 2 of the composite heating element is removed from its series connection with resistance element 1, and is then connected in parallel with resistance element 1 and the applied voltage V. Such parallel connection of the two resistance elements 1 and 2 reduces the resistance of the composite heating element, thereby increasing the heat produced in the composite heating element whereby it will operate with an effective energy at least four times greater than when the tool is operating at low heat or in series connection. Upon releasing or returning the switch 3 to its normal series connection position, resistance element 2 of the composite heating element is returned to series connection with resistance element 1, thereby increasing the resistance induced in the composite heating element resulting in a reduction in the energy induced in the heating circuit.

While the circuits shown in Figures 1, 2, and 3 appear to accomplish only two levels of heat and temperature in the tool, any level intermediate to these two can be obtained by cycling the switch 3 as the tool is used to obtain and maintain the intermediate working temperature desired.

The tool illustrated in Figure 4 is shown comprising a tubular supporting member or body commonly called a barrel 4, provided at one end with a threaded socket 5, adapted to receive a working tip 6, having an axial bore 7 therein, whose bottom 8 is located in proximity to the terminal end of the tip 6, as shown. The bottom 8 is preferably flat or slightly curved to avoid dead air space between it and the end 21 of the heating element body 9, although the bottom 8 can also be cone-shaped such as is formed by the end of a drill. The heating element body 9 is removably received in the bore 7, of the tip 6. As shown in Figure 4, but also in Figure 6 with better detail, the double section heating element body 9 has an enlarged flange 10 that is received and closely fitted to the enlarged bore 11 in the tubular member or barrel 4. The flange 10 of the heating element body 9 is prevented from moving farther into the tubular member or barrel 4 because of the inside diameter 12 of the tubular member 4, said inside diameter 12 being smaller than the diameter of the flange 10. To secure the flange 10 in the enlarged bore 11 of the barrel 4, a ceramic cement is used.

An important feature of the present invention is the double section electrical resistance wire wound heating element 1, 2 consisting of the two sections 1 and 2 contained within the heating element body 9. As shown in Figure 4 but also with better detail in Figure 5, the heating element's section 1 and section 2 consist of an electrical resistance wire wound in one or more insulated layers around and insulator core 13 with each end connected to lead wires 14 and 15 and with lead wire 16 connected to an intermediate point of the electrical resistance wire wound heating element 1, 2 at the junction 17, of section 1 and section 2. This construction can be readily carried out as shown in detail in Figure 5 in which the resistance wire for the electrical heating element section 1 is first connected to lead wire 14 and then wound around a hollow core insulator 13 with one wire diameter, approximately, spacing between the turns of the resistance wire on the core 13, for insulation between turns unless an insulated resistance wire is used in which case the turns can be close wound, and then the other end of the resistance wire is connected at the other end of the core 13 at junction 17 to the lead wire 16 which runs through the center of the hollow core insulator 13. The hollow core insulator 13 can either be an integral extension from the shoulder or flange 10 or the core 13 can be a separate part pressed and cemented into the flange 10. The other section 2 of the electrical heating element 1, 2 is made by first connecting the resistance wire of this section 2 to the lead wire 15 and then winding this resistance wire over section 1 but is insulated from section 1 by an insulating layer 18 which may be a thin wall ceramic or mica tube slipped over section 1 of the heating element 1, 2. Insulating layer 18 may otherwise be a layer of mica wrapped around section 1 before winding section 2. For small diameters, particularly when less than one-quarter of an inch, the ceramic tube is more practical for the layer of insulation 18 between the layers of wire than is mica which is difficult to form on such a small diameter. Section 2 is wound with the same spacing or insulation between turns as described for section 1. The other end of the resistance wire of section 2 is connected at the junction 17 of the lead wire 16. Over the outside winding or section 2 of the double section electrical heating element 1, 2 is slid a thin wall ceramic or mica tube 19 which forms the outside of the electrically insulated heating element body 9. The tube 19 is preferably pressed and cemented into a recess 20 which can be provided in flange 10. This seals, strengthens, and improves the outside appearance of the heating element body 9 and flange 10 assembly. The end 21 of the body 9 is closed and sealed by filling with a ceramic cement.

A properly designed heating element rarely fails due to the wire but a failure at the terminal connection of the resistance wire due to arcing caused by oxidation at the connection is likely unless the terminal connection is well designed and constructed. The lead wires selected, such as Monel, nickel, mangrid, or similar wire, should have a high resistance to oxidation. This aids in securing a good electrical bond at the connection with the resistance wire. In our invention we prefer to make the electrical connection of the resistance wire of the heating element sections 1 and 2 to the lead wires 14, 15, and 16 by slightly flattening the otherwise round lead wire in the area of the connection, then wrapping a few turns around the flattened part of the wire. By wrapping the resistance wire on a flattened section of the lead wire, which after flattening has a cross sectional shape approaching a rectangle, the resistance wire has no tendency to spring away from the lead wire as it does when it is wrapped around a round wire. The use of a square shaped or a flat wire for leads will eliminate the necessity for flattening the lead wire in the vicinity of the connection. After wrapping the resistance wire around the flattened or rectangularly shaped portion of the lead wire, the connection is then welded by a high temperature welding alloy which flows in and around the lead wire and the wrapping of resistance wire forming a small, neat, mechanically, and electrically secure connection between the resistance wire and the lead wire. This connection has the appearance of a soldered connection but has a much higher melting point than a soldered connection which cannot be used because of the high temperature. The presence of the welding alloy over the resistance wire and the lead wire at their terminal connection protects these wires at that point from oxidation.

The flange 10 has three small holes through which the lead wires 14, 15, 16 pass. Inside the flange 10 two of these holes are enlarged to form a seat 43 which is well fitted to the respective electrical connections of the lead wires 14 and 15 with their respective resistance wires from the heating element section 1 and section 2. These two connections seat in their respective holes on the inside of flange 10 and are cemented therein making them mechanically secure from twisting or pulling through the holes and into the barrel 4. For the same reasons, the lead wire 16 is secured by its fit in the hollow core 13, by the size of junction 17, and by cementing.

A suitable handle 22, as shown in Figure 4, comprises two like sections or halves to be bolted together by suitable machine screws. The handle sections, preferably of molded plastic, cooperate to provide a bore 23 adapted to receive the tubular body or barrel 4 and a recessed seat adapted to receive the fillister head pin 24 pressed into a tight fitting hole in the barrel 4 whereby the handle section or halves when bolted together clamp the barrel 4 and the pin 24 in such a manner that the barrel 4 cannot twist, become loose, or be detached from the handle. The handle is shown provided with a recess 25 for receiving one end of a suitable electric supply cord 26, comprising the electrical conductors 27 and 28 which are connected respectively to the lead wire 14 and a terminal on the switch 3. The recess 25 is so shaped as to receive a knot 30 in the cord 26 which does prevent the cord 26 from twisting inside the handle 22 and which takes up any external strain placed on the cord 26 and prevents the said strain from being placed on the electrical connections made by conductors 27 and 28 within the handle 22. A suitable electrical connector plug 29, adapted for connection to conventional outlets, is provided at the outside end of the cord 26.

A suitable normally open push-to-make switch 3 of conventional construction is shown received in a bore 31 in the handle 22 and in Figure 4 the said switch is shown as having one end of the conductor 28 of the cord 26 electrically connected and soldered thereto. To the same terminal of switch 3 is connected and soldered lead wire 15. To the other terminal of switch 3 is connected and soldered the lead wire 16. The connection of switch 3 and the lead wires 14, 15, 16 and the conductors 27 and 28 correspond to the electrical circuit shown in Figure 1. These connections may be modified as in the electrical circuit shown in Figure 2. These connections and the switch 3 shown in Figure 4 may also be modified as in the electrical circuit shown in Figure 3.

The tubular body of barrel 4 of the tool shown in Figure 4 has an enlarged bore 32 at the handle end of the barrel 4 to receive a close fitting electrical insulator 33 of ceramic, plastic or other suitable insulating material which is pressed and cemented into the bore 32 of the barrel 4. This insulator 33 has three holes lengthwise to its diameter to permit the the three lead wires 14, 15, 16 to be inserted one through each hole. The lead wires 14, 15, 16 extend from the double section electrical heating element 1, 2 through the flange 10 at the end of the barrel 4 lengthwise through the tubular body or barrel 4 said wires being retained in spaced relation to one another and to the inside diameter 12 of the barrel 4 and extend through the insulator 33 at the other end of the barrel 4. These lead wires 14, 15, 16 retain their spaced relationship by being held taut between the flange 10 and the insulator 33 at the opposite ends of the barrel 4. During assembly the lead wires 14, 15, 16 are held taut in spaced relationship to one another and to the inside of the barrel while a small bead 34 of solder or welding alloy or a small crimp 34 is placed on each of the lead wires 14, 15, 16 where they emerge from the insulator 33. The lead wires 14, 15, 16 are insulated from one another and from the barrel's inside wall 12 by their spaced relationship, tautness, and by the ceramic flange 10 and the electrical insulator 33. They can be further insulated by asbestos or other suitable covering or sleeve over each wire, or by ceramic tubing, or by mica insulating separators. Between the insulator 33 and the terminal connections at switch 3, insulating flexible plastic tubing is slipped over the lead wires for insulation.

Another important feature of our present invention is the double section electrical resistance wire wound heating element 1, 2 around the working tip 35 as shown in Figure 7. Since Figure 7 illustrates a modification of the tool shown in Figure 4, only the parts modified are presented in Figure 7. This modified portion is shown as comprising a barrel 4 provided at one end with a threaded socket 36, adapted to receive the adapter 37 of a double section electrical heating element center body 38, having a threaded axial bore 39 therein, adapted to receive a working tip 35. The center body 38 has wound around it one or more layers of an electrical resistance wire to make a double section electrical heating element 1, 2. The lead wires 14 and 15 are connected to the two ends of the double section heating element 1, 2 and the lead wire 16 is connected to an intermediate point of the element at the junction 17 of section 1 and section 2 of the double section element 1, 2. These connections are made and welded in the same manner as the connections described earlier in the explanation of Figures 4 and 5. The first and second layer of wire of the heating section 1 and section 2 are separated by a layer 18 of mica or a thin wall ceramic tube. The lead wire 16 connects to junction 17 and is insulated from the remainder of the outer winding by a layer of mica. A ceramic cap 40 is pressed over the assembly of the body and the heating element windings and is cemented and sealed on with a ceramic cement. A small groove is allowed on the inside of the cap 40 to provide room for the lead wire 16. Sufficient cement is used to fill all cavities between the center body 38 and the cap 40. The outer end of the cap 40 is beveled to meet the smaller diameter of the tip 35. Upon assembly the adapter 37 of the heating element center body 38 is cemented into the threaded socket 36 of the barrel 4 which receives the said adapter.

In Figure 7, since the connection of the lead wire 15 to section 2 is made at a point 90 degrees or more removed from the connection of the lead wire 14 to section 1, it is hidden from view behind the threaded portion of the tip 35.

Figure 8 shows a working tip having a cup shaped end 42 adapted to the shape of and to engage the head of a type of rivet 44 commonly called an explosive rivet. Only a portion of the working tip 41 is shown as the only change presented is the cup shaped working end 42.

A study of the drawings shows that the parts are readily made and assembled and that the use of molded parts, such as ceramic insulators and a plastic handle in two halves, extruded ceramic thin wall tubing, and readily machined parts are conducive to low cost manufacturing of the tool.

In the foregoing we have shown and described the control switch 3 as requiring manual operation when changing the tool from low to high heat operation. From actual experience we have found that by utilizing a push type switch such as shown in Figure 4, which requires that the push button be manually held in high heat position, the danger of an operator inadvertently leaving the tool in high heat, when momentarily leaving the tool to perform other operations, is completely eliminated, because the moment the operator releases his grip on the tool handle 22, the switch 3 automatically returns to its normal series connection position. In some cases it may be found desirable to utilize a thermally controlled switch in lieu of the manually operable switch shown.

It will be apparent to those skilled in the art that we have accomplished at least the principal objects of our invention and that the embodiments herein described may be variously changed and modified without departing from the spirit of the invention and that the invention is capable of uses and has advantages not herein specifically described; hence that the herein disclosed embodiments are illustrative only, and that our invention is not limited thereto.

We claim as our invention:

1. In a soldering iron, a tubular body, a working tip secured to one end of said body, two resistance elements mounted within the tip in heat conducting relation thereto, and a manually operable switch for controlling the flow of electric current through said resistance elements whereby said resistance elements may be selectively operated in series or parallel to provide low or high heat, said heating element when operating at high heat having an induced energy at least four times greater than when operating at low heat.

2. In a soldering iron, a tubular body, a working tip secured to one end of said body and having an enlarged bore therein, the bottom of which is disposed adjacent to the working end of the tip, a pair of resistance elements mounted in said bore in insulated relation to the walls thereof, means for holding the tip and body in working position, conductors for connecting said resistance elements to a source of electric current, and a switch mounted in said holding means and electrically connected with said conductors, and adapted, when in one position, to cause the resistance elements to operate in series to provide low heat for the tip, and when in another position, causing the resistance elements to operate in parallel to provide high heat for the tip with an induced energy at least four times greater than when operating at low heat.

3. In a soldering iron, a tubular body, a working tip secured to one end of said body and having an enlarged bore therein the bottom of which is disposed adjacent to the working end of the tip, a pair of resistance elements mounted in said bore in insulated relation to one another and to the walls of the bore, means for holding the tip and body in working position, conductors for connecting said resistance elements to a source of electric current, and a spring-actuated switch mounted in said holding means and electrically connected with said conductors, said switch when in normal position, causing the resistance elements to operate in series to provide low heat for the tip, and said switch when manually actuated, causing the resistance elements to operate in parallel to provide high heat, said heating element when operating at high heat having an induced energy at least four times greater than when operating at low heat.

4. In a soldering iron, a hollow elongated body, a working tip detachably secured to one end of said body, said tip having an enlarged axial bore therein the bottom of which is disposed in close proximity to the working end of the tip, a composite heating unit comprising a cylindrical body of a suitable insulating material, said heating unit fitting in said bore with its wall in heat conducting relation to the walls of the bore, said heating unit having two resistance elements mounted therein in insulated relation to one another, conductors electrically connected to said resistance elements and extending lengthwise through the tubular body in insulated relation thereto, and a series-parallel switch electrically connected to said conductors for controlling the action of said resistance elements, and whereby they may be operated in series or parallel to thereby selectively provide low or high heat for the working tip having an energization ratio of at least one to four.

5. In a soldering iron, a hollow elongated body, a working tip detachably secured to one end of said body, said tip having an enlarged axial bore therein the bottom of which is disposed in close proximity to the working end of the tip, a self-contained heating unit comprising a cylindrical body of a suitable insulating material fitting in said bore with its walls in heat conducting relation to the walls of the bore, resistance elements mounted in the cylindrical body of the heating unit, conductors electrically connected to said resistance elements and extending lengthwise through the tubular body in insulated relation thereto, a current supply circuit, and a manually operable control switch electrically connecting said conductors to a supply circuit, said switch, when in normal condition causing the resistance elements to operate in series to provide low heat for the tip, and when said switch is actuated, said heating elements are connected in parallel to thereby cause the heating elements to operate at high heat with an induced energy at least four times greater than when operating at low heat thereby quickly heating the tip.

BERTRAM F. RITCHIE.
CHESTER H. HOLTAN.

REFERENCES CITED

The following references are of record in the file of this patent:

UNITED STATES PATENTS

| Number | Name | Date |
|---|---|---|
| 1,431,039 | Quednow et al. | Oct. 3, 1922 |
| 1,478,319 | Young | Dec. 18, 1923 |
| 1,534,542 | Reimers et al. | Apr. 21, 1925 |
| 2,391,065 | McKinley | Dec. 18, 1945 |
| 2,424,848 | Reitan | July 29, 1947 |